United States Patent
Etzkorn et al.

(10) Patent No.: US 8,382,076 B2
(45) Date of Patent: Feb. 26, 2013

(54) OBJECT-SUPPORT COLUMN

(75) Inventors: Matthias Etzkorn, Lehmen (DE);
Manfred Metzdorf, Koblenz (DE);
Thomas Müller, Leuterod (DE)

(73) Assignee: Stabilus GmbH, Koblenz (DE)

( * ) Notice: Subject to any disclaimer, the term of this patent is extended or adjusted under 35 U.S.C. 154(b) by 1264 days.

(21) Appl. No.: 12/075,550

(22) Filed: Mar. 12, 2008

(65) Prior Publication Data
US 2008/0258021 A1 Oct. 23, 2008

(30) Foreign Application Priority Data
Mar. 12, 2007 (DE) .................. 10 2007 012 222

(51) Int. Cl.
*F16F 5/00* (2006.01)
(52) U.S. Cl. ............... 267/64.11; 267/64.12; 267/64.22; 267/64.26; 188/281; 188/300; 188/312; 188/314; 188/322.14; 248/157; 248/161; 248/404; 248/631; 297/217.3; 297/344.19; 297/411.36
(58) Field of Classification Search .............. 264/64.11; 267/64.11, 64.12, 124, 126, 117; 248/157, 248/631, 161, 404; 297/344.19; 188/300
See application file for complete search history.

(56) References Cited

U.S. PATENT DOCUMENTS

| | | | |
|---|---|---|---|
| 5,090,770 A | | 2/1992 | Heinrichs et al. |
| 5,670,872 A | * | 9/1997 | Van De Walle et al. ...... 324/171 |
| 5,806,828 A | * | 9/1998 | Rothe et al. .................... 248/631 |
| 6,923,502 B2 | * | 8/2005 | Cassaday ................... 297/217.3 |
| 7,306,192 B2 | | 12/2007 | Sopp |
| 2001/0045693 A1 | * | 11/2001 | Job ............................ 267/64.11 |
| 2004/0061266 A1 | | 4/2004 | Riel et al. |
| 2006/0175743 A1 | * | 8/2006 | Chung ......................... 267/64.12 |

FOREIGN PATENT DOCUMENTS

| | | |
|---|---|---|
| DE | 102 44 671 | 4/2004 |
| JP | 2299609 | 12/1990 |
| JP | 9119466 | 5/1997 |
| JP | 10211048 | 8/1998 |
| JP | 2002336095 | 11/2002 |
| JP | 2004270719 | 9/2004 |
| JP | 2005009617 | 1/2005 |

* cited by examiner

*Primary Examiner* — Robert A Siconolfi
*Assistant Examiner* — San Aung
(74) *Attorney, Agent, or Firm* — Cozen O'Connor

(57) ABSTRACT

A support column with a vertical tube has a coaxially installed gas spring including a cylinder divided by a piston into first and second working chambers. A piston rod passes through the second working chamber in a sealed manner to the outside, where it is attached to a bottom support piece of the vertical tube. The cylinder projects out of the vertical tube and is guided with freedom to slide back and forth in a guide sleeve installed in the end of the vertical tube opposite the bottom support piece. A connection between the first and second working chambers can be blocked by a manually actuatable valve. A second valve between the chambers, which is closed when the gas spring is under load, can be switched to the open position after the load on the gas spring has been absent for a certain period of time.

11 Claims, 4 Drawing Sheets

OBJECT-SUPPORT COLUMN

BACKGROUND OF THE INVENTION

1. Field of the Invention

The invention pertains to an object-support column with a vertical tube, which has a bottom support piece at one end and a guide sleeve installed in the other end. A gas spring coaxially installed in the vertical tube includes a cylinder filled with pressurized gas, the cylinder being divided by a piston into a first and a second working chamber, where one end of the piston rod is attached to the piston, whereas the other end passes through the second working chamber in a sealed manner to the outside, where it is attached to the bottom support piece. An object on which force can be exerted can be mounted on the end of the cylinder projecting out of the vertical tube, and a connection between the first working chamber and the second working chamber can be blocked by a manually openable valve.

2. Description of the Related Art

In object-support columns of this type, it is known that a piston rod which has moved into its outward-extended position can be moved back into the cylinder again by opening the manually actuated valve and exerting force on the column. Conversely, when there is no load on the object-support column, a piston rod located within the cylinder can be allowed to travel outward by opening the manually actuated valve.

Object-support columns of this type are used especially as chair columns, where the height of the chair seat can be adjusted in a continuously variable manner.

After the seat has been adjusted to a height which is lower than the maximum possible height, this height will be retained after the occupant has left the chair until it is adjusted again manually.

If a large number of these chairs are present in a room and if they have been set to a position lower than their maximum height, an unattractive picture is created if they are not returned to that maximum height.

To change this situation, that is, to ensure that the chairs create a uniform picture, it would be necessary to adjust manually each individual chair back to its maximum height, which would require a great deal of effort.

On the other hand, if the occupant leaves the chair for only a short period of time, he should, upon returning to the chair, be able to find the chair still at the previously selected height and not be required to adjust it again.

SUMMARY OF THE INVENTION

An object of the invention is therefore to provide an object-support column of the type indicated above which, after the load on it has been released, briefly remains in its adjusted position with the piston rod inside the cylinder, but which, after there has been no load on it for an extended period of time, resumes the position in which the piston rod is fully extended from the cylinder.

According to the invention, a second valve is installed in a second connection between the first working chamber and the second working chamber. This valve can be switched from the closed position, i.e., the position which it occupies when the gas spring is under load, to the open position after the load on the gas spring has been absent for a certain period of time.

As a result, during short periods of time when there is no load on the gas spring, both valves remain closed, and the piston rod remains in its previous position, pushed either partially or all the way in.

After the specified period of time has elapsed, however, a connection between the first and the second working chamber is opened. Because the piston has a larger effective surface area in the outward-travel direction than in the inward-travel direction, the piston rod is pushed outward into its maximum outward position as the pressure equalizes between the two working chambers.

The load state of the gas spring can preferably be detected by a sensor, which can measure the pressure in the first working chamber.

Because the pressure of the pressurized gas in the first working chamber is higher when the gas spring is under load than when it is not under load, the sensor can detect the load state of the gas spring.

Another way in which the load state of the gas spring can be detected is to provide a sensor which is able to detect the force being exerted on an object.

If the object-support column is a chair column and the object is the seat of the chair, the sensor can detect the force acting on the seat of the chair, which can be the force which the occupant of the chair exerts when sitting.

The second valve can be located in the piston or in or on one of the end walls of the cylinder.

The components can be considerably reduced in number and simplified by designing the manually actuatable valve and the second valve, which is actuated as a function of load, as a single valve with a single connection between the first working chamber and the second working chamber, namely, by a valve which can be opened both manually and as a function of load.

The second valve or the single valve is preferably an electromagnetic valve which remains closed when no current is passing through it.

If the single valve, designed as an electromagnetic valve, is located in a cylinder consisting of ferromagnetic material, the cylinder simultaneously forms a magnetic yoke for the magnetic field lines, which increases the effectiveness of the magnetic forces of the electromagnetic valve.

The electromagnetic valve can have a coil mounted on a coil frame, inside of which a core is provided, which projects out from one end of the coil; and an armature, which faces the end of the core projecting from the coil, can be moved axially with respect to the core by a regulating distance, and carries a closing element on the side facing away from the core, by means of which element an opening of the single connection can be closed, the armature being spring-loaded toward this opening.

To actuate the second valve or the single valve a certain amount of time after the load on the previously loaded gas spring has been released, the sensor preferably generates a release signal to indicate that the load on the gas spring has been released. This signal can be sent to a control unit. The control unit has a timing element, which can be triggered by the load-release signal, and which after a certain period of time actuates the second valve or the single valve, thus opening it.

The manually actuated valve is preferably an electromagnetic valve.

Upon actuation, a manually actuated switching unit can generate an opening signal, which is transmitted to the manually actuatable electromagnetic valve or to the single electromagnetic valve to open it.

If the opening signal can be transmitted by the switching unit via a connecting line, then the switching unit can be mounted on the object-support column.

It is also possible, however, for the opening signal to be transmitted by the switching unit in wireless fashion.

In this case, a single radio-transmitted opening signal can be used to move all the chairs in a room back to their maximum height.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
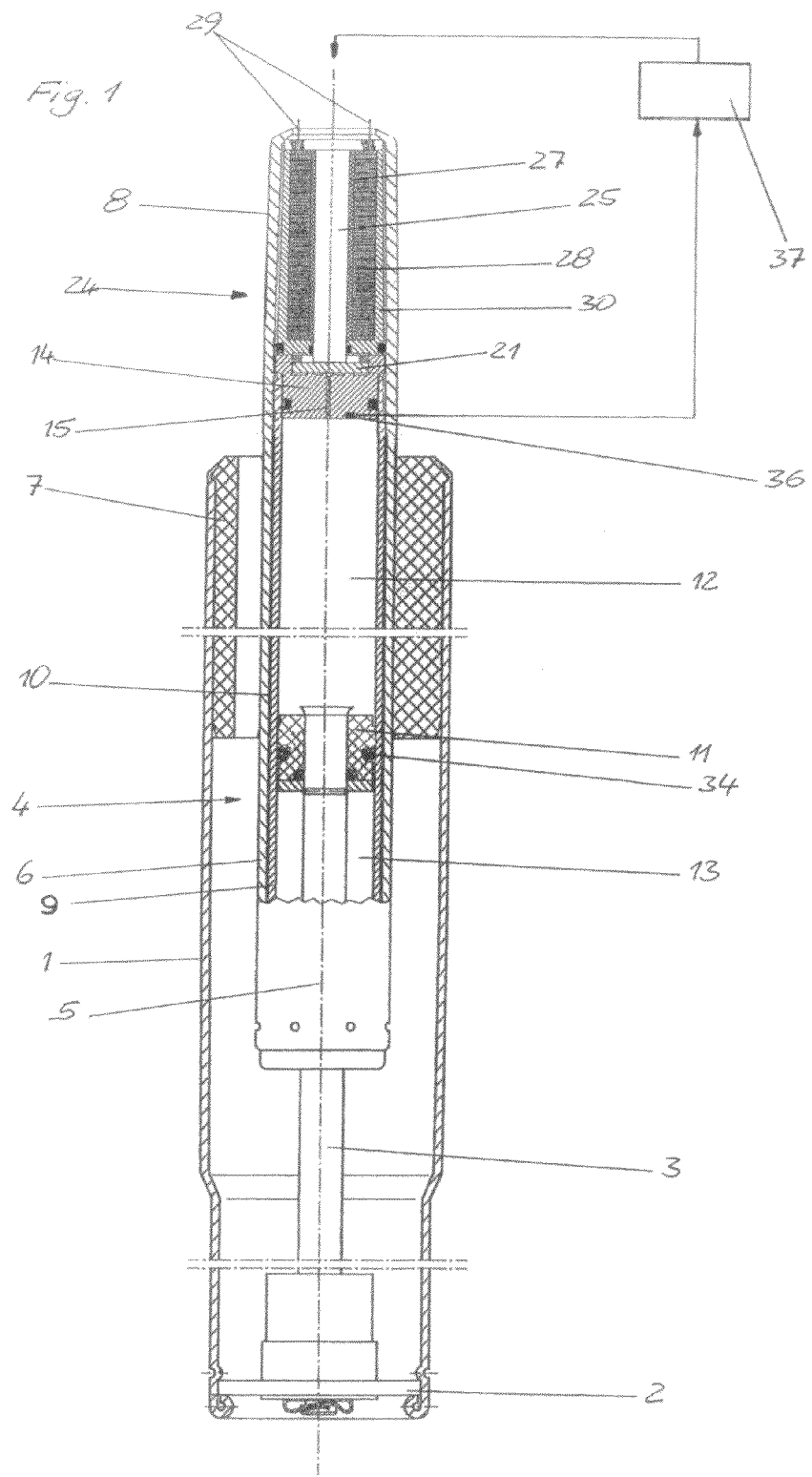
FIG. 1 shows a cross-sectional view through an object-support column.
Figure 2:
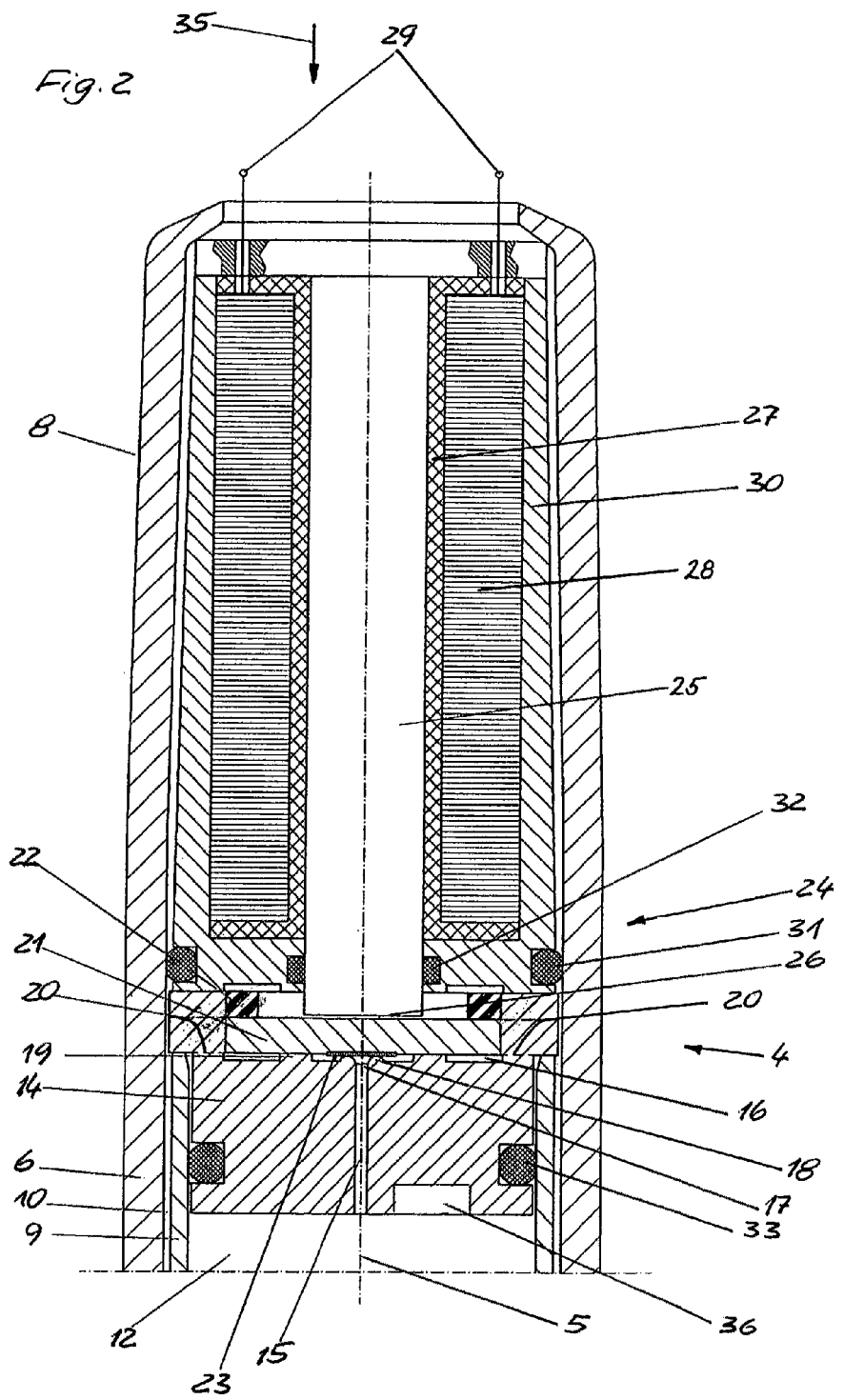
FIG. 2 shows an enlarged cross-sectional view of part of the upper area of the gas spring of the object-support column according to FIG. 1.

The object-support column for a chair shown here has a vertical tube 1. A base with feet (not shown) can be provided at the bottom end of the column, which is of reduced diameter.

At the bottom end of the vertical tube 1, a bottom support piece 2 is permanently installed. The free end of piston rod 3 of a gas spring 4 is attached to this support piece in such a way that it is axially supported but is still free to rotate around its longitudinal axis 5.

The gas spring 4 has a cylinder 6, which is guided with freedom of axial movement in a guide sleeve 7, which is fixed in the upper end of the vertical tube 1. The cylinder 6 projects out from the upper end of the vertical tube 1. The end of the cylinder 6 projecting from the vertical tube 1 is slightly tapered to form a cone which accepts a seat bracket (not shown).

Coaxially inside the cylinder, a guide tube 9 filled with a pressurized gas is permanently installed in such a way that an annular gap 10 is formed between the cylinder 6 and the guide tube 9.

At the end of the gas spring where the piston rod 3 exits from the cylinder 6, the annular gap 10 is connected to the interior space (second working chamber 13) of the guide tube 9.

The piston rod 3 is introduced in a sealed manner into the guide tube 9 and carries a piston 11 at the end projecting into the guide tube 9. The piston divides the interior space of the guide tube 9 into a first working chamber 12 and a second working chamber 13 and has freedom to slide back and forth in the guide tube 9.

The upper end of the first working chamber 12 is closed off by an end wall 14 in the guide tube 9.

In the end wall 14, a continuous coaxial connection 15 is formed, which leads from the first working chamber 12 to a valve chamber 16 of circular cross section, where, at the opening 17 leading into the valve chamber 16, the axially projecting valve seat 18 of an electromagnetic valve 24 is formed, the valve seat extending in a ring-shaped manner around the opening 17.

A certain distance away from the valve seat 18 and encircling it, the end wall 14 has a ring-shaped stop 19, which projects axially in the same way as the valve seat 18.

Figure 3:
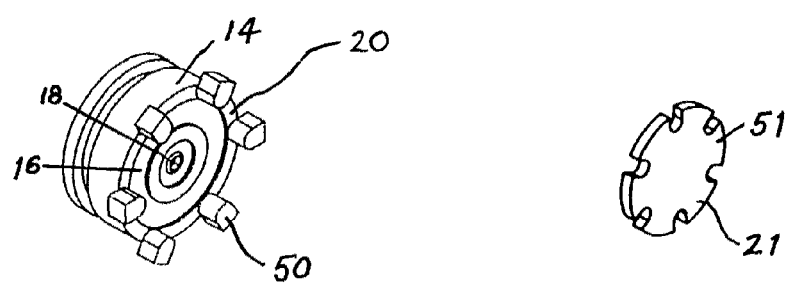
FIG. 3 is an exploded perspective of the end wall and the armature, showing the radial passages which connect the first working chamber to the second working chamber.

Radial passages 20 lead from the valve chamber 16 to the ring-shaped gap 10. As best seen in FIG. 3, these passages 20 are formed between axial protrusions 50 on top of end wall 14. These passages 20 are closed by radial protrusions 51 on a disk-like armature 21, which protrusions 51 are seated in the passages 20 until the armature 21 is lifted under the action of coil 28.

The disk-like armature 21, formed as a plate, is guided with freedom of movement in the valve chamber 16. At the circumferential edge area, this armature is subjected to the actuating force of an axially supported, ring-like elastomeric spring element 22, which spring-loads the armature against the valve seat 18 and the stop 19.

In the area of the valve seat 18, the armature 21 has a disk-like closing element 23 made of an elastomeric material, which closes off the connection 15 when the closing element 23 rests on the valve seat 18.

When the valve passage 15 is closed, a gap is present between the surface of the armature 21 facing away from the valve seat 18 and one end surface of the core 25; this gap forms an regulating distance 26.

The core 25 extends through a ring-like coil frame 27 of a coil 28. The two ends 29 of the coil project axially out of the cylinder 6.

The cylinder 6 is made of ferromagnetic material, and the area of the cylinder which carries the cone 8 surrounds the coil 28 and the coil frame 27 as well as a cup-like mounting part 30 for the coil 28 and the coil frame 27.

The mounting part 30 is sealed off by a first sealing ring 31 against the inside wall of the cylinder 6 and by a second sealing ring 32 against the cylindrical core 25.

By means of a third sealing ring 33, the end wall 14 is sealed off against the inside wall of the guide tube 9, and by means of a fourth sealing ring 34, the piston 11 is sealed off against that same inside wall.

The coil 28 can be energized by closing a manually actuatable switch unit, which may be incorporated in a control unit 37. As a result of the energization of the coil 28, the armature 21 carrying the closing element 23 is lifted from the valve seat 18 against the force of the spring element 22, so that the first working chamber 12 is connected to the second working chamber 13 via the connection 15, the valve chamber 16, the radial bores 20, and the annular gap 10.

When load is exerted on the gas spring 4 in the load direction 35, the piston 11 and the piston rod 3 travel into the guide tube 9. Cutting off the current to the coil has the effect of closing the electromagnetic valve 24, and the seat bracket is held at the desired height.

So that the seat bracket can be moved back to the maximum outward position, it is necessary merely to remove the load from the seat and thus from the gas spring 4 and to manually open the electromagnetic valve 24. The piston 11 and the piston rod 3 will then travel outward as a result of the difference between the effective surface areas of the two sides of the piston as the pressures in the first and second working chambers 12 and 13 equalize.

A sensor 36, which is mounted in the end wall 14, detects the pressure in the first working chamber 12 and transmits a corresponding signal to the control unit 37.

When the sensor 36 detects a change from an elevated pressure in the first working chamber 12 caused by the load on the seat and on the gas spring to a lower pressure resulting from the removal of that load, it generates an opening signal and transmits this to the control unit 37.

The control unit 37 contains a timing element, which delays the transmission of an output signal from the control unit 37 by a certain period of time such as 10 minutes.

If the seat and thus the gas spring 4 are again subjected to load within this period of time, the control unit 37 does not transmit an output signal.

If the seat and the gas spring 4 remain relieved of load, however, the control unit 37 transmits an output signal, which has the effect of energizing the coil 28, so that the electromagnetic valve 24 opens and the piston 11 and the piston rod 3 travel from the inward position to the maximum outward position.

Figure 4:
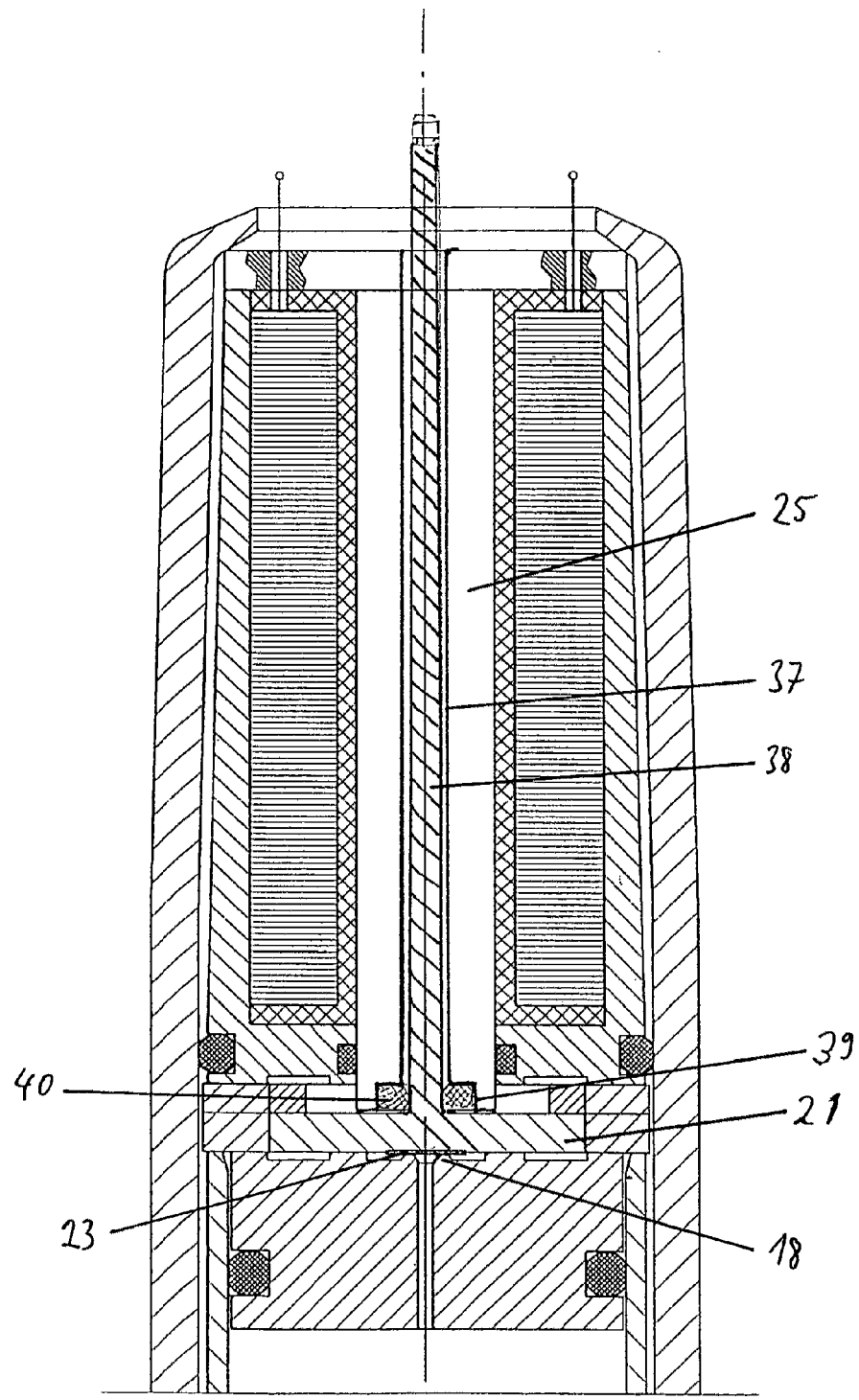
FIG. 4 shows an example of manually actuatable valve and the second valve designed as a single valve.

FIG. 4 shows a manually actuatable valve designed as a single valve with the solenoid actuated second valve. Here the armature 21, which can be lifted by the solenoid to open the radial passages 20, can also be manually lifted by a rod 38 connected to the armature 21 and extending through a bore concentric bore 37 in the core 25. The radial passages 20 can thereby connect the connection 15 from the first working chamber 12, to the annular gap 10 which communicates with the second chamber 13. A seal 40 is provided in a recess 39 in the core 25, so that leakage via the bore 37 does not occur.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An object support column comprising:
   a vertical tube having a closed end with a bottom support piece and an open end fitted with a guide sleeve;
   a gas spring comprising a cylinder which is slideably received in said guide sleeve, said cylinder having an end which can be subjected to a load extending out of the vertical tube, said cylinder being filled with pressurized gas, said spring further comprising a piston which divides said cylinder into a first working chamber and a second working chamber, and a piston rod having one end fixed to the piston and an opposite end fixed to the bottom support piece, the piston rod passing through the second chamber and emerging from the cylinder; and
   a valve in a connection between the first working chamber and the second working chamber, the valve being manually actuatable and automatically actuatable, wherein the valve remains closed when the end of the cylinder is subjected to a load, and which opens after a predetermined amount of time after the load on the gas spring is released;
   a sensor configured to detect a load state of the gas spring; and
   a control unit that receives a load-release signal from the sensor, the control unit having a timer triggered by the load-release signal to open the valve after the pre-determined amount of time,
   wherein the valve is an electromagnetic valve which is closed when not energized and comprises a coil frame mounted on a core and carrying a coil, the core having an end extending from the coil frame, and an armature facing the end of the core and separated from the core by a regulating distance, the armature carrying a closing element facing an opening of the connection, the armature being spring-loaded toward the opening so that the closing element is against the opening when the coil is not energized.

2. The object support column of claim 1 wherein the sensor detects pressure in the first working chamber.

3. The object support column of claim 1 wherein the sensor detects force exerted on the cylinder.

4. The object support column of claim 1 wherein the cylinder has an end wall bounding the first working chamber opposite from the piston, the valve being located on the end wall.

5. The object support column of claim 1 wherein the electromagnetic valve is located in the cylinder, which is made of ferromagnetic material.

6. The object support column of claim 5 further comprising a switching unit which can be manually actuated to transmit an opening signal for opening the valve.

7. The object support column of claim 1 further comprising a switching unit which can be manually actuated to transmit an opening signal for opening the valve.

8. The object support column of claim 7 wherein the opening signal can be transmitted from the switching unit by a connecting line.

9. The object support column of claim 7 wherein the opening signal can be transmitted from the switching unit in wireless fashion.

10. The object support column of claim 1, further comprising a rod connected to the armature, the rod having a free end manually actuatable to lift the armature.

11. The object support column of claim 1, wherein the armature is lifted toward the core when the coil is energized.

\* \* \* \* \*